US006798457B2

(12) United States Patent
Boyden et al.

(10) Patent No.: US 6,798,457 B2
(45) Date of Patent: Sep. 28, 2004

(54) CAMERA POSITIONING SYSTEM AND METHOD FOR EYE-TO-EYE COMMUNICATION

(75) Inventors: James H. Boyden, Seattle, WA (US); David W. Meibos, Sandy, UT (US); Thomas M. Hardman, Salt Lake City, UT (US)

(73) Assignee: Digeo, Inc., Kirkland, WA (US)

(*) Notice: Subject to any disclaimer, the term of this patent is extended or adjusted under 35 U.S.C. 154(b) by 273 days.

(21) Appl. No.: 09/964,285

(22) Filed: Sep. 26, 2001

(65) Prior Publication Data

US 2003/0058334 A1 Mar. 27, 2003

(51) Int. Cl.[7] ............................ H04N 5/225; H04N 7/14
(52) U.S. Cl. ................................... 348/373; 348/14.16
(58) Field of Search .............................. 348/373, 14.16, 348/374, 375, 376; 396/419, 428; 248/442.2, 918

(56) References Cited

U.S. PATENT DOCUMENTS

| 3,520,587 | A |   | 7/1970  | Tasaki et al. ............... 350/36 |
| 3,533,583 | A | * | 10/1970 | Azim ....................... 248/125.2 |
| 4,284,898 | A |   | 8/1981  | Felkel et al. ............... 250/551 |
| 4,607,622 | A |   | 8/1986  | Fritch et al. ................ 128/6 |
| 4,714,184 | A |   | 12/1987 | Young et al. ............... 224/253 |
| 4,863,130 | A |   | 9/1989  | Marks, Jr. ................ 248/206.3 |
| 5,012,348 | A | * | 4/1991  | Witzel et al. .............. 348/373 |
| 5,074,512 | A | * | 12/1991 | Gianforcaro et al. ..... 248/442.2 |
| 5,292,099 | A | * | 3/1994  | Isham et al. .............. 248/442.2 |
| 5,318,257 | A |   | 6/1994  | Tani ........................ 248/125 |
| 5,359,362 | A |   | 10/1994 | Lewis et al. .............. 348/15 |
| 5,438,357 | A |   | 8/1995  | McNelley .................. 348/15 |
| 5,456,245 | A |   | 10/1995 | Bornhop et al. ........... 600/139 |
| 5,500,671 | A |   | 3/1996  | Andersson et al. ......... 348/15 |
| 5,519,597 | A |   | 5/1996  | Tsai ........................ 362/386 |
| 5,526,180 | A | * | 6/1996  | Rausnitz .................. 359/609 |
| 5,572,248 | A |   | 11/1996 | Allen et al. ............... 348/15 |
| 5,612,733 | A |   | 3/1997  | Flohr ...................... 348/14 |
| 5,615,854 | A | * | 4/1997  | Nomura et al. ........... 248/287.1 |
| 5,655,833 | A | * | 8/1997  | Raczynski .................. 362/419 |
| 5,675,376 | A |   | 10/1997 | Andersson et al. .......... 348/20 |
| 5,678,793 | A |   | 10/1997 | Hill ........................ 248/206.3 |
| 5,713,548 | A |   | 2/1998  | Boyer et al. ............. 248/205.2 |
| 5,769,374 | A | * | 6/1998  | Martin et al. ............ 248/221.11 |
| 5,815,197 | A |   | 9/1998  | Kakii ....................... 348/20 |
| 5,855,343 | A |   | 1/1999  | Krekelberg ............... 248/121 |
| 5,906,348 | A | * | 5/1999  | Orenstein ................. 248/311.2 |
| 5,917,542 | A |   | 6/1999  | Moghadam et al. ........ 348/207 |
| 5,986,703 | A |   | 11/1999 | O'Mahony ................. 348/333 |
| 6,005,604 | A |   | 12/1999 | Kakii ....................... 348/20 |
| 6,010,235 | A |   | 1/2000  | Sawyer ..................... 362/351 |
| 6,081,422 | A |   | 6/2000  | Ganthier et al. ........... 361/686 |
| 6,172,703 | B1|   | 1/2001  | Lee ......................... 348/15 |
| 6,259,470 | B1|   | 7/2001  | Koizumi et al. ........... 348/14.1 |
| 6,462,781 | B1|   | 10/2002 | Arnold ..................... 348/373 |

FOREIGN PATENT DOCUMENTS

JP          07-131697          5/1995

OTHER PUBLICATIONS

Wireless Video Surveillance: System Concepts by Petri Mähönen; pp. 1–6.
The Embedded Bluetooth CCD Camera by Ko Sung–Yuan; 2001; pp. 1–4.

* cited by examiner

Primary Examiner—Wendy R. Garber
Assistant Examiner—Timothy J. Henn
(74) Attorney, Agent, or Firm—Kory D. Christensen; Stoel Rives LLP

(57) ABSTRACT

Eye-to-eye videoconferencing may be carried out through the use of a motion coupling that positions a strut at least partially across a screen, near the eye level of the viewer. A camera may be mounted on a camera portion of the strut to obtain a video image of the viewer. The motion coupling may permit translation or rotation of the strut to reposition the camera. The motion coupling may be selectively lockable through internal,friction or through the use of a locking device. The camera may be movable along the camera portion via a camera translational coupling.

75 Claims, 7 Drawing Sheets

FRONT

BACK

CAMERA POSITIONING SYSTEM AND METHOD FOR EYE-TO-EYE COMMUNICATION

BACKGROUND

1. Field of the Invention

The present invention relates generally to the field of video communication. More specifically, the present invention relates to a system and method for positioning a camera to enable eye-to-eye videoconferencing.

2. Description of Related Background Art

Videoconferencing is rapidly becoming a popular method of communication between remote parties who wish to approximate face-to-face contact without travel. As bandwidth limitations are ameliorated, more events such as business meetings, family discussions, and shopping may be expected to take place through videoconferencing.

Unfortunately, videoconferencing has been limited in the past by the relative positions of the camera, the display screen, and the person. More specifically, the camera is typically positioned above, beside, or below the screen. As a result, a person looking into the screen appears to be looking above, below, or to the side of the person with whom they are speaking. Eye contact is never actually made because neither party looks at the camera; rather, each person looks at his or her own screen. Consequently, both parties perceive that true face-to-face communication is not occurring.

The communicating parties may find themselves unable to adequately understand each other, and may even prematurely terminate the videoconferencing session out of frustration. Hence, poor quality communications are not only problematic for the communicating parties, but also for the entity that provides the communication channel. To the extent that access to the channel is metered, longer videoconferencing sessions will provide greater profits.

Some devices have been made in an attempt to more closely simulate eye-to-eye communication. Such devices may involve, for example, the use of complex and specialized display screens with advanced optical and projection equipment. Unfortunately, most consumers would wish to communicate via conventional, inexpensive personal computer or entertainment hardware such as "webcams" and televisions.

Accordingly, what is needed is a system and method for obtaining an image of a person from along the person's eye level when the person is looking at the image of a second person on a screen. Preferably, such a system should lend the impression of eye-to-eye communication without unduly burdening other aspects of the videoconferencing process. Additionally, such a system and method should preferably be adaptable to existing consumer hardware.

BRIEF DESCRIPTION OF THE DRAWINGS

Non-exhaustive embodiments of the invention are described with reference to the figures, in which.

DETAILED DESCRIPTION OF THE PREFERRED EMBODIMENTS

Figure 1:
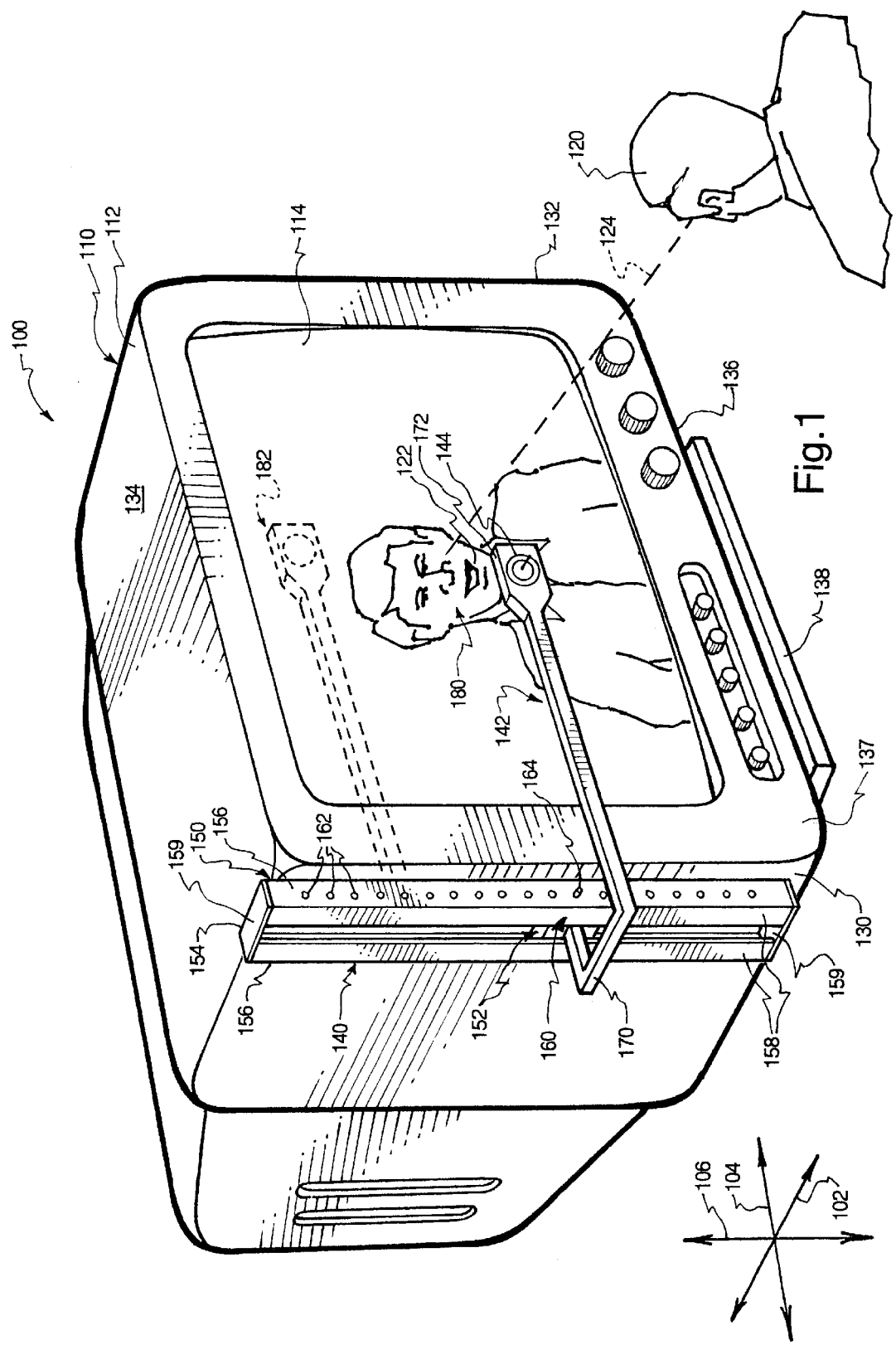
FIG. 1 is a perspective view of one embodiment of an apparatus for obtaining a video signal from a position proximate an eye level of a person viewing a display screen.

The present invention solves the foregoing problems and disadvantages by providing an apparatus for obtaining a video signal from a position proximate an eye level of a person viewing a display screen. In conjunction with the apparatus, a method of positioning the camera is also provided. The apparatus and method may be configured in a wide variety of ways to suit specific videoconferencing situations.

In one implementation, the apparatus may include a motion coupling, a strut, and a camera. The motion coupling may be used to selectively move a first end of the strut with respect to a first side of a display screen. A camera may be disposed at a camera portion of the strut such that the camera is positioned between the viewer and the screen. The viewer may thus use the motion coupling to move the camera to an eye level position, in which the camera is close to the level at which the viewer looks at the display screen. Similarly, the motion coupling may be used to move the camera to a retracted position to avoid obscuring the display screen during normal use.

Of course, the actual location of the camera will vary depending on the viewer. For some viewers, moving the camera to an eye level position will require the camera to be positioned at the center of the display screen. For other viewers, however, the camera may need to be positioned in other areas of the display screen.

The motion coupling may be a translational coupling. In one embodiment, the translational coupling may take the form of a track and slider assembly disposed on a left or right side of the display screen. The first end of the strut may be affixed to the slider, which may ride within a vertically-oriented track. The strut may thus extend horizontally across the display screen, so that the camera can be moved vertically.

The track and slider assembly may have a locking mechanism so that the strut, and hence the camera, can be maintained at a desired position. The locking mechanism may take the form of a button disposed on the slider that can be selectively inserted into any one of a plurality of locking apertures formed in the track. When inserted into a locking aperture, the button fixes the position of the slider with respect to the track so that the camera is locked in place.

In another embodiment, the translational coupling may take the form of an axle and roller assembly that rolls along the first side of the display screen. The strut may extend fully across the display screen; a second end of the strut may then be attached to a second axle and roller assembly that rolls along a second side of the display screen. The first and second sides may, for example, be top and bottom sides.

In another embodiment, the translational coupling may take the form of a worm gear and collar assembly with a worm gear extending along the first side of the display screen. The collar may have internal threading that mates with the worm gear such that rotation of the worm gear induces translation of the collar. The first end of the strut may be affixed to the collar; the strut may also have a second end similarly coupled to a second worm gear and collar assembly disposed on the second side of the display screen.

Each of the worm gears may be driven by an electric motor. The user may thus initiate motion of the camera by activating a switch connected to the motors. The worm gear and collar assemblies need no locking mechanism because the friction and mechanical advantage of the worm gear keeps the strut in place in the absence of rotation by the motors.

The motion coupling may also be a rotational coupling. The rotational coupling may be implemented as a rod and collar assembly positioned on a side of the display screen. The rod and collar assembly may, for example, be positioned on any side of the display screen, and either the rod or the collar may be attached to the display screen. Thus, the strut may extend either horizontally or vertically across the display screen. In one embodiment, the rod is attached to the display screen, and the collar has a bore at one end to receive the rod. The rod may be inserted into the collar such that the collar rotates around the rod within a plane that is substantially perpendicular to a screen portion of the display screen.

The rod and collar assembly may have a locking mechanism so that the strut, and hence the camera; can be maintained at a desired position. The locking mechanism may take the form of a button located on the rod that can be selectively inserted into any one of a plurality of locking apertures arrayed at least partially around an outside diameter of the collar. When inserted into a locking aperture, the button fixes the position of the collar with respect to the rod so that the camera is locked in place. In alternate embodiments, the rotational coupling may frictionally restrict rotation of the collar about the rod.

Regardless of the type of motion coupling used, the camera may be coupled to the strut by a camera translational coupling that permits translation of the camera along the strut. The camera translational coupling may take the form of a cart assembly with wheels disposed on either side of the strut. The cart assembly may have a locking mechanism such as a knob with a threaded stem that can be threaded through a hole in the cart to selectively restrict motion of the cart. In another embodiment, the camera translational assembly may be implemented as a gripping sleeve attached to the camera to frictionally engage the strut. In yet another embodiment, the camera translational assembly may be implemented as a telescoping segment that slides within the strut. The camera may be attached to the telescoping segment, so that the position of the camera may be adjusted by sliding the telescoping segment.

In one embodiment, a rotational coupling may be used in conjunction with a camera translational assembly. For example, a rod and collar assembly may be used in conjunction with a gripping sleeve. The rod may be attached to the front of the display screen and inserted into the collar such that the collar rotates around the rod within a plane that is substantially parallel to a screen portion of the display screen. In such an embodiment, the position of the camera may be adjusted in two different ways: first, by rotating the collar about the rod, and second, by moving the gripping sleeve along the strut.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of translational couplings, attachment devices, camera positions, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Referring to FIG. 1, a perspective view shows one embodiment of an apparatus 100 for obtaining a video signal from a position proximate an eye level of a person viewing a display screen. The apparatus 100 may have a longitudinal direction 102, a lateral direction 104, and a transverse direction 106.

A display screen 110 may be of any known type, such as a cathode ray tube (CRT) screen, a liquid crystal display (LCD), liquid plasma display, analog or digital projection, or the like. Advantageously, the display screen 110 may be a device commonly available to consumers, such as a computer monitor or television. The display screen 110 may have a housing 112 that contains the internal components of the display screen, and a screen portion 114 on which images are displayed.

The display screen 110 may be used by a person to conduct videoconferencing with a second person, whose image 122 is shown on the screen portion 114 of the display screen 110. The person 120 may be expected to look at the image 122, so that the person 120 is looking along an eye level 124, as shown by a dashed line in FIG. 1. The person 120 may, for example, look approximately at the eyes of the person whose image 122 is shown on the screen portion 114.

The display screen 110 may have a left side 130, a right side 132, a top side 134, a bottom side 136, and a front side 137. Furthermore, the display screen 110 may have a base 138 that supports the weight of the display screen 110. The base 138 may be rigid, or may permit swiveling or tilting of the display screen 110. Of course, the display screen 110 may also operate without a base 138.

The apparatus 100 may have a first translational coupling 140 disposed on a first side of the display screen 110, i.e., on the left side 130, the right side 132, the top 134, or the bottom 136. A strut 142 may extend from the first translational coupling 140 at least part way across the screen portion 114 to position a camera 144 over the screen portion 114.

The strut 142 may advantageously be made as thin as possible in the transverse direction 106 to avoid obscuring the image 122 any more than necessary. For example, the strut 142 may be only a few millimeters thick in the transverse direction 106. For ease of illustration, the strut 142 is depicted in FIG. 1 as being thicker, perhaps a centimeter or more. Of course, the precise thickness of the strut 142 is not crucial to the invention.

As shown in FIG. 1, the first translational coupling 140 is attached to the left side 130. As used herein, a "translational coupling" is simply any device that couples two objects together in such a way that relative linear motion between the two objects is permitted. "Translation," within this application, refers to motion substantially along a straight line. However, some variance from exact linear motion is permitted. In some instances, translation may include motion along a very broad arc designed to compensate for curvature in the screen portion 114 of the display screen 110 or for curvature of the housing 112.

A translational coupling may take a wide variety of forms. Those of skill in the mechanical arts will recognize that a wide variety of linear conveyers and actuators are known. Three examples of translational couplings are presented in FIGS. 1 through 3; however, any known linear conveyer or actuator may be used.

The first translational coupling 140 of FIG. 1 takes the form of a first track and slider assembly 140. The first track and slider assembly 140 may have a track 150 rigidly affixed to the housing 112 on the left side 130. The track 150 may be disposed in the transverse direction 106. A slider 152 may ride along the length of the track 150, in the transverse direction 106.

The track 150 may have a back plate 154 that abuts and is attached to the left side 130 and side plates 156 disposed on either side of the slider 152 to keep the slider 152 from moving in the longitudinal direction 102. Additionally, the track 150 may have front plates 158 that keep the slider 152 from leaving the track 150 in the lateral direction 104. End plates 159 may limit the range of motion of the slider 152 in the transverse direction 106 so that the slider 152 is unable to slide past the ends of the track 150.

The net effect of the plates 154, 156, 158, 159 of the track 150 is to restrict motion of the slider 152 to translation along a finite path in the transverse direction 106. The first track and slider assembly 140 may have a locking mechanism 160 that selectively locks the slider 152 within the track 150 so that the slider 152 is also unable to move in the transverse direction 106.

The locking mechanism 160 may, for example, take the form of a button and locking aperture assembly 160. The button and locking aperture assembly 160 may have a series of locking apertures 162 disposed along the length of the track 150, i.e., arrayed in the transverse direction 106. The locking apertures 162 may, for example, be formed in the side plate 156 that faces the person 120. A button 164 of the button and locking aperture assembly 160 may be coupled to the slider 152, and may extend toward the person 120. The button 164 may be biased toward the locking apertures 162 through the use of a linear spring, torsional spring, gas spring, leaf spring, elastomeric member, or the like.

The person 120 may disengage the button and locking aperture assembly 160 by pressing the button 164 out of its associated locking aperture 162 and into the track 150. The person 120 may then move the slider 152 in the transverse direction 106. When the slider 152 reaches the desired position along the track 150, the user may permit the button 164 to extend into the nearest locking aperture 162 to lock the slider 152 in position.

The strut 142 may have a first end 170 affixed to the slider 152 and a camera portion 172 positioned inward of the first end 170. Accordingly, the camera portion 172 may be positioned in the transverse direction 106 near the center line of the display screen 110, if desired. The camera 144 is located at the camera portion 172. If the camera 144 is to be slidable along the camera portion 172, as will be depicted in other embodiments, the camera portion 172 may have a substantial length, and may even include the entire length of the strut 142 that passes adjacent to the screen portion 114.

If desired, the camera 144 may be rigidly attached to the strut 142 at the camera portion 172. Alternatively, the camera 144 may be attached to the strut 142 through the use of a camera translational coupling (not shown), so that the camera 144 can move along the camera portion 172, in the lateral direction 104. The apparatus 100 may thus be made retrofittable for use with an existing camera 144 as well as the display screen 110.

However, as shown in FIG. 1, the camera 144 may be embedded within the camera portion 172 of the strut 142. The strut 142 may have a hollow structure constructed of a plastic material; the strut 142 may be enlarged at the camera portion 172 to contain the internal components of the camera 144. Wiring may run from the camera portion 172 through the strut 142 to connect to signal formatting and/or transmission hardware to convey the signal from the camera 144 to the person whose image 122 is shown on the screen portion 114. Of course, a wireless transmitter/receiver system may also be used.

In various embodiments, the first track and slider assembly 140 could be disposed along any of the sides 130, 132, 134, 136 of the display screen 110. The strut 142 may thus extend in the lateral direction 104 as shown, or in the transverse direction 106. If desired, the strut 142 may be disposed at some angle within the plane of the lateral 104 and transverse directions 106. The strut 142 may also be angled or otherwise extended in the longitudinal direction 102 to remove the camera 144 somewhat from the surface of the screen portion 114.

Optionally, a second track and slider assembly (not shown) may be disposed opposite the first track and slider assembly 140. For example, if the first track and slider assembly 140 is positioned on the left side 130 as shown in FIG. 1, the second track and slider assembly may be positioned on the right side 132 of the display screen 110. The strut 142 may then be extended to span the distance between the first track and slider assembly 140 and the second track and slider assembly. The camera 144 may then be positioned at the middle of the strut 142. Such a configuration, with two translational couplings, may provide additional structural support for the strut 142.

The apparatus 100 may be sold as a kit that includes the first track and slider assembly 140, the strut 142, and the camera 144. The user 120 may then connect the first track and slider assembly 140, the strut 142, and/or the camera 144 together and attach the first track and slider assembly 140 to the left side 130 of an existing display screen 110 such as a television, computer monitor, or the like. Such a kit may even include only the first track and slider assembly 140 and the strut 142; the kit may then be utilized to position an existing camera 144, such as a commonly available webcam, with respect to an existing display screen 110.

The person 120 may use the apparatus 100 to position the camera 144 at an eye level position 180, which may be positioned proximate the eyes of the image 122 on the screen portion 114. When the display screen 110 is in use for purposes other than videoconferencing, such as computer or television use, the camera 144 may be moved to a retracted position 182 in which the camera 144 and the strut 142 do not significantly overlap the screen portion 114. In FIG. 1, the retracted position 182 is shown over the top of the screen portion 114. The camera 144 could also be moved to many other positions to avoid obstructing use of the display screen 110.

According to one embodiment, the apparatus 100 also contains additional components (not shown) that effectively protect the person 120 against undesired operation of the camera 144. More specifically, software or mechanical devices may be used to ensure that the camera 144 only operates in the eye level position 180.

For example, a physical switch, magnetic switch, or the like may be connected to the track 150 and the first end 170 of the strut 142 such that the signal from the camera 144 is only received when the strut 142 is centrally positioned with respect to the track 150. Light-emitting diodes (LED's) or other indicators may be disposed on the camera 144 or other parts of the apparatus 100 to indicate when the camera 144 is operative. Alternatively, a mechanical shutter may be coupled to the strut 142 and/or the track 150 such that the mechanical shutter automatically closes when the camera 144 is removed from the eye level position 180.

If desired, the camera 144 may have an adjustable tilt setting, so that the person 120 need not have his or her head directly aligned with the display screen 110 in the transverse direction 106. The person may also use such a tilt setting to utilize the camera 144 for videoconferencing in the retracted position 182, if desired; the person may simply tilt the camera 144 downward to account for the fact that the camera 144 is disposed above the screen portion 114.

Displacing the camera 144 slightly from the eyes of the image 122 provides the realistic semblance of eye-to-eye communication for the person whose image 122 is displayed on the screen portion 114, i.e., the person with whom the person 120 using the apparatus 100 is communicating. For example, the camera 144 may be disposed slightly beneath the head of the image 122, as shown in FIG. 1.

In alternate embodiments, the camera 144 may be disposed slightly above or to the side of the head of the image 122. Thus, the camera 144 need not be disposed precisely along the eye level 124. If the camera 144 is simply positioned proximate, or close to, the eye level 124, the person whose image 122 is shown on the screen portion 114 may not notice that the person 120 is looking slightly up or down, or to one side. Thus, if both parties involved in videoconferencing are using an apparatus 100, slight displacement of the cameras 144 from eye level 124 may provide realistic eye-to-eye communication for both parties simultaneously.

However, in accordance with the present invention, the camera 144 may be positioned precisely along the eye level 124 so that, depending on the geometry of the camera 144 and the strut 142, the eyes of the person whose image 122 is displayed may be blocked by the camera 144 and the strut 142.

Clearly, the camera 144 need not be disposed in the center of the screen portion 114, as shown in FIG. 1. For the reasons described above, it may be desirable to position the camera 144 off-center. Furthermore, the image 122 may not be centered, but may be within a window with any size or location on the screen portion 114. Hence, motion of the camera 144 in the lateral 104 and transverse directions 106 may be desirable so that the position of the camera 144 can be adapted to suit the size and position of the image 122.

Figure 2:
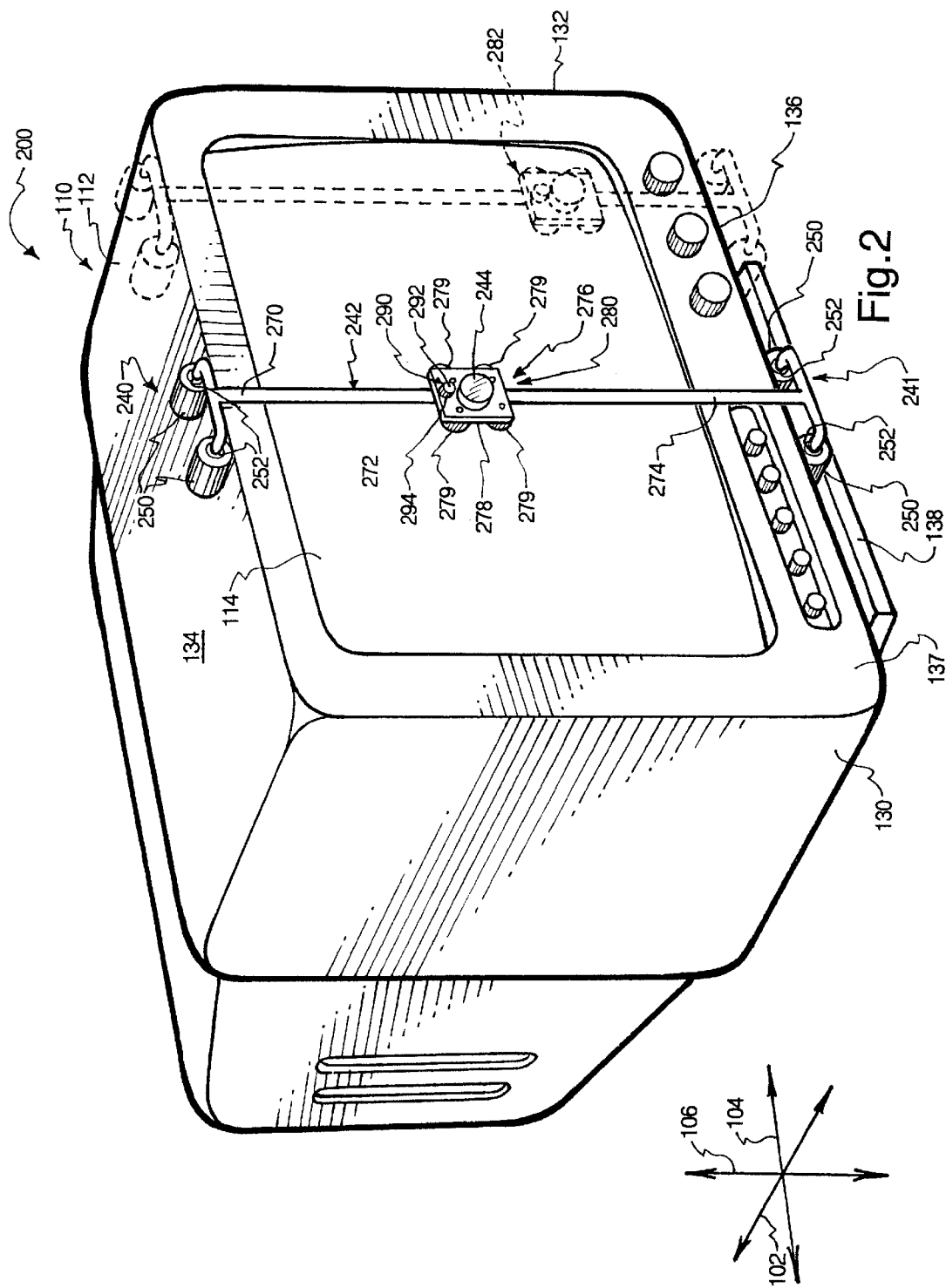
FIG. 2 is a perspective view of an alternative embodiment of an apparatus for obtaining a video signal from a position proximate an eye level of a person viewing a display screen.

Although the apparatus 100 depicted in FIG. 1 does not permit motion in the lateral direction 104, the strut 142 and the camera 144 may easily be adapted to provide such two-axis motion through the use of a camera translational coupling, as described previously. FIG. 2 shows an apparatus that provides such two-axis motion.

Referring to FIG. 2, an alternative embodiment provides an apparatus 200 for obtaining a video signal from a position proximate an eye level of a person viewing a display screen 110. The apparatus 200 has a first translational coupling 240 and a second translational coupling 241 opposite the first translational coupling 240. In FIG. 2, the first translational coupling 240 is disposed on the top side 134 of the display screen 110, and the second translational coupling 241 is disposed on the bottom side 136. Of course, positioning on the left and right sides 130,132 would also be possible.

In the apparatus 200, the first translational coupling 240 takes the form of a first roller assembly 240, and the second translational coupling 241 takes the form of a second roller assembly 241. A strut 242 extends fully across the screen portion 114, from the first roller assembly 240 to the second roller assembly 241. A camera 244 is located on the strut 242 such that the camera 244 can be positioned between the screen portion 114 and the person 120 (not shown in FIG. 2).

Each of the roller assemblies 240, 241 may have one or more rollers 250, each of which rotates about an axle 252 attached to the strut 242. The axles 252 are shown in a substantially perpendicular disposition with respect to the strut 242 because it is assumed that the top and bottom sides 134, 136 of the display screen 110 are horizontal. However, if the top and bottom sides 134, 136 are angled, the axles 252 may be angled in a corresponding fashion. Additionally, two rollers 250 are shown in each of the roller assemblies 240, 241; the use of multiple rollers is not required, but may enhance the stability of the apparatus 200.

The strut 242 may have a first end 270 attached to the axles 252 of the first roller assembly 240, a camera portion 272 defined as the portion along which the camera 244 is movable, and a second end 274 attached to the axles 252 of the second roller assembly 241. The camera 244 may be movable along the camera portion 272, such that the camera 244 moves between the first and second ends 270, 274.

More specifically, the camera 244 may not be rigidly affixed to the strut 242, but may be movably attached via a camera translational coupling 276. As shown, the camera translational coupling 276 takes the form of a cart assembly 276. The camera 244 is disposed on a cart 278 that is coupled to the strut 242 through the use of wheels 279.

The strut 242 may simply be cylindrical in shape, and the wheels 279 may be disposed to sandwich the strut 242 between them. If desired, each of the wheels 279 may have a flared shape at the edges to increase the surface area in contact with the strut 242. The strut 242 may alternatively have a rectangular cross section, and may even have teeth (not shown) that mesh with corresponding teeth of the wheels 279 (not shown).

In any case, the wheels 279 and the strut 242 may be configured to maintain stability in the lateral direction 104, while still permitting motion in the transverse direction 106, along the length of the strut 242. Only two wheels 279 may be used, but four wheels 279 are present in the cart assembly 276 of FIG. 2 to provide additional stability. Of course, numerous other translational coupling types exist, as previously described; the cart assembly 276 may effectively be replaced with any such translational coupling.

The first roller assembly 240, the second roller assembly 241, and the cart assembly 276 may be utilized in concert to position the camera 244 at an eye level position 280. As mentioned in connection with the previous embodiment, the eye level position 280 need not be precisely along the eye level 124, and need not be centered with respect to the screen portion 114. The dual axis motion of the camera 244 permits the camera 244 to be positioned at nearly any position on the screen portion 114. Thus, the apparatus 200 of FIG. 2 is well adapted to situations in which the image 122 is positioned off center on the screen portion 114.

A retracted position 282 of the camera 244 may be obtained through motion of the roller assemblies 240, 241 and the cart assembly 276. Thus, the retracted position 282 may be toward the center of any of the sides 130, 132, 134, 136 of the display screen 110, or may be in a corner between two of the sides 130, 132, 134, 136, as shown.

As shown in FIG. 2, the first and second roller assemblies 240, 241 have no locking mechanism. No such mechanism may be needed because the rollers 250 move horizontally, and therefore may tend to remain in place. However, a locking mechanism 290 may be used in conjunction with the cart assembly 276 to selectively lock the cart assembly 276 in place with respect to the strut 242.

The locking mechanism 290 may, for example, take the form of a knob and threaded hole assembly 290. The knob and threaded hole assembly 290 may include a knob 292 that can be easily gripped and rotated by the person 120. The knob 292 may be threadably engaged within a threaded hole 294 of the cart 278.

When the knob 292 is tightened, the threaded stem of the knob 292 may abut the strut 242 to frictionally maintain the position of the cart 278 with respect to the strut 242. If desired, the threaded stem of the knob 292 may have a rubberized tip or other feature designed to enhance the frictional engagement. Of course, numerous other locking mechanism types are known, and any known locking mechanism may be used in place of the knob with a threaded stem and threaded hole assembly 290 of FIG. 2.

Figure 3:
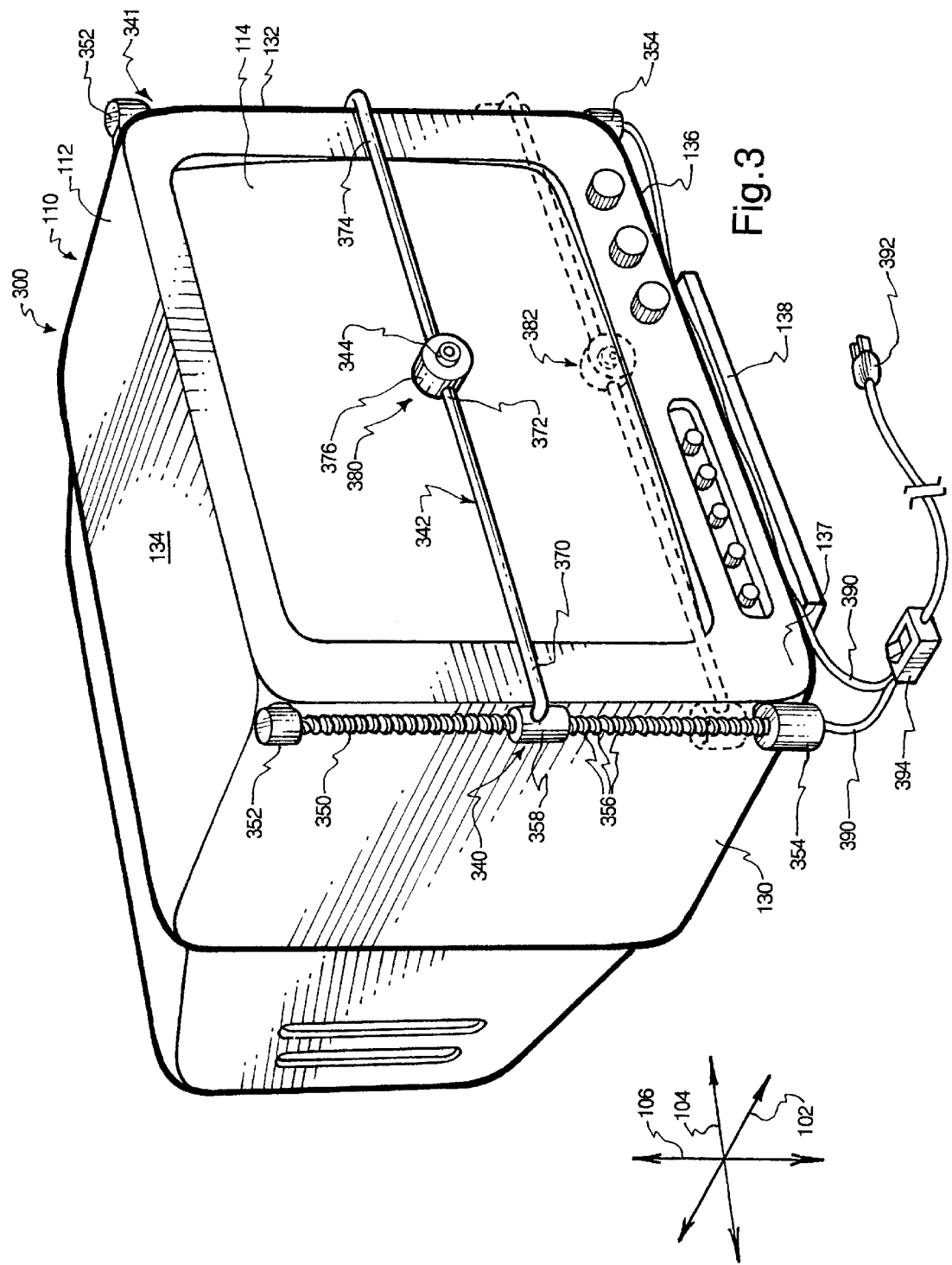
FIG. 3 is a perspective view of another alternative embodiment of an apparatus for obtaining a video signal from a position proximate an eye level of a person viewing a display screen.

In the apparatus 200 of FIG. 2, the person 120 manually, i.e., by hand, adjusts the position of the camera 244. However, in certain embodiments, adjustment of the location of the camera 244 may be mechanized, and may even occur automatically. FIG. 3 presents an embodiment in which mechanized adjustment occurs.

Referring to FIG. 3, another alternative embodiment shows an apparatus 300 for obtaining a video signal from a position proximate an eye level of a person viewing a display screen. The apparatus 300 has a first translational coupling 340 and a second translational coupling 341 opposite the first translational coupling 340. In FIG. 3, the first translational coupling 340 is disposed on the left side 130 of the display screen 110, and the second translational coupling 341 is disposed on the right side 132. Of course, positioning on the top and bottom sides 134, 136 would also be possible. Furthermore, the apparatus 300 may be modified to function without the second translational coupling 341.

In the apparatus 300, the first translational coupling 340 takes the form of a first worm gear and collar assembly 340, and the second translational coupling 341 takes the form of a second worm gear and collar assembly 341. A strut 342 extends fully across the screen portion 114, from the first worm gear and collar assembly 340 to the second worm gear and collar assembly 341. A camera 344 is located on the strut 342 such that the camera 344 can be positioned between the screen portion 114 and the person 120 (not shown in FIG. 3).

The worm gear and collar assemblies 340, 341 may each have a worm gear 350 extending along the transverse direction 106. Each worm gear 350 may be rotatably attached to the housing 112 by an anchor bushing 352 and a motor 354. As shown, the anchor bushings 352 are affixed to the top of the left and right sides 130, 132, and the motors 354 are attached to the bottom of the left and right sides 130, 132.

Each worm gear 350 is simply a shaft with threads 356 running along its length. Each of the worm gear and collar assemblies 340, 341 may have a collar 358 with internal threads (not shown) that mate with the threads 356 of the worm gears 350. Thus, when the worm gears 350 rotate in place, if the collars 358 are unable to rotate, they will translate along the length of the worm gears 350.

The strut 342 may have a first end 370 attached to the collar 358 of the first worm gear and collar assembly 340, a camera portion 372, and a second end 374 attached to the collar 358 of the second worm gear and collar assembly 341. The camera 344 may be disposed at the camera portion 372. The attachment of the first and second ends 370, 374 to the collars 358 ensures that the collars 358 are unable to rotate with the worm gears 350, and must therefore move in the transverse direction 106 in response to rotation of the worm gears 350.

As shown, the camera 344 is not contained within the strut 342; rather, the camera 344 has a camera housing 376 separate from the strut 342. The camera housing 376 may be affixed to the strut 342 through the use of adhesive, fasteners, suction, welding, or any other known attachment method. If desired, the strut 342 need not extend fully across the camera housing 376, but may simply be attached to either end of the camera housing 376. Thus, the camera housing 376 may act as the camera portion 372 of the strut 342.

The camera 344 of FIG. 3 is rigidly affixed to the strut 342. However, as with previous embodiments, the camera 344 may be attached to enable motion along the camera portion 372, for example, through the use of a camera translational coupling (not shown).

The worm gear and collar assemblies 340, 341 may be utilized to move the camera 344 between an eye level position 380 and a retracted position 382. As with previous embodiments, the eye level position 380 need not be precisely at the eye level 124, and need not be centered with respect to the screen portion 114. Additionally, the retracted position 382 may be at the bottom of the screen portion 114, as shown, or at any other suitable location.

The motors 354 may be electrically driven. Hence, each of the motors 354 may be connected to a power cord 390, through which electricity is delivered to the motors 354 from an electric plug 392. The electric plug 392 may be designed for use with an ordinary household electrical outlet. The motors 354 may be designed to rotate at substantially the same speed to ensure that the strut 342 remains horizontal.

The power cords 390 may be connected to the electric plug 392 via a switch 394, so that the person 120 can selectively activate the motors 354 by operating the switch 394. The switch 394 may be a three-way switch, so that the motors 354 can be deactivated, rotated to induce upward motion of the camera 344, or rotated to induce downward motion of the camera 344.

As an alternative or in addition to the switch 394, the motors 354 may be triggered through software, or even automatically activated upon the commencement of videoconferencing. Thus, the camera 344 may be automatically moved from the retracted position 382 to the eye level position 380 for eye-to-eye videoconferencing.

Figure 4:
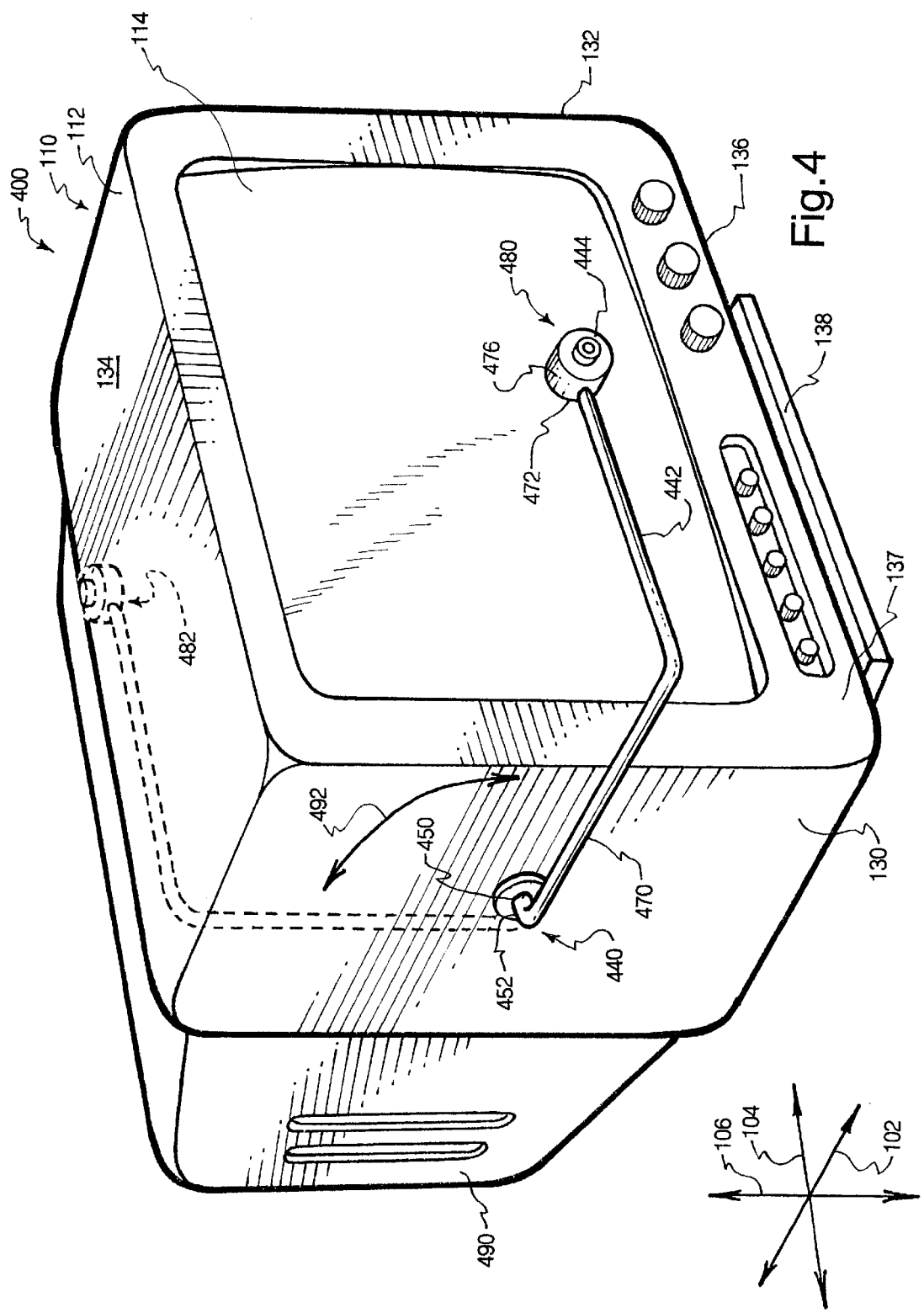
FIG. 4 is a perspective view of another alternative embodiment of an apparatus for obtaining a video signal from a position proximate an eye level of a person viewing a display screen.

Referring to FIG. 4, another alternative embodiment shows an apparatus 400 for obtaining a video signal from a position proximate an eye level of a person viewing a display screen. The apparatus 400 has a rotational coupling 440 positioned on the left side 130 of the display screen 110. Of course, the rotational coupling 440 may also be positioned on the right side 132, top side 134, bottom side 136, or front side 137.

In the apparatus 400, the rotational coupling 440 is implemented as a rod and collar assembly 440. A strut 442 extends partially across the screen portion 114. A first end 470 of the strut 442 is attached to the rod and collar assembly 440. A camera portion 472 of the strut 442 is attached to the camera 444 such that the camera 444 can be positioned between the screen portion 114 and the person 120. As with the camera 344 shown in FIG. 3, the camera 444 in FIG. 4 has a camera housing 476 which may act as the camera portion 472 of the strut 442. The camera 444 may be attached to the strut 442 through any known attachment method, or the camera 444 may be contained within the strut 442.

The rod and collar assembly 440 includes a male portion 450, or a rod 450, that is attached to the display screen 110, and a female portion 452, or a collar 452, with a bore (not shown in FIG. 4) to receive the rod 450. The collar 452 is attached to the first end 470 of the strut 442. In alternate embodiments, the collar 452 could be attached to the display screen 110, and the rod 450 could be attached to the first end 470 of the strut 442. In FIG. 4, the rod 450 is inserted into the collar 452 such that the collar 452 rotates around the rod 450. The camera 444 may thus be rotated from an eye level position 480 to a retracted position 482 along the direction shown by the arrow 492. In other words, the camera 444 may be rotated within a plane that is substantially perpendicular to the screen portion 114 of the display screen 110.

"Substantially perpendicular," within this application, includes rotation that is not exactly perpendicular. In some instances, the rod and collar assembly 440 may be attached to a slanted portion 420 of the display screen 110. In such case, rotation of the camera 444 would be within a plane that is not exactly perpendicular to the screen portion 114 of the display screen 110, but the rotation would still be "substantially perpendicular."

Figure 5:
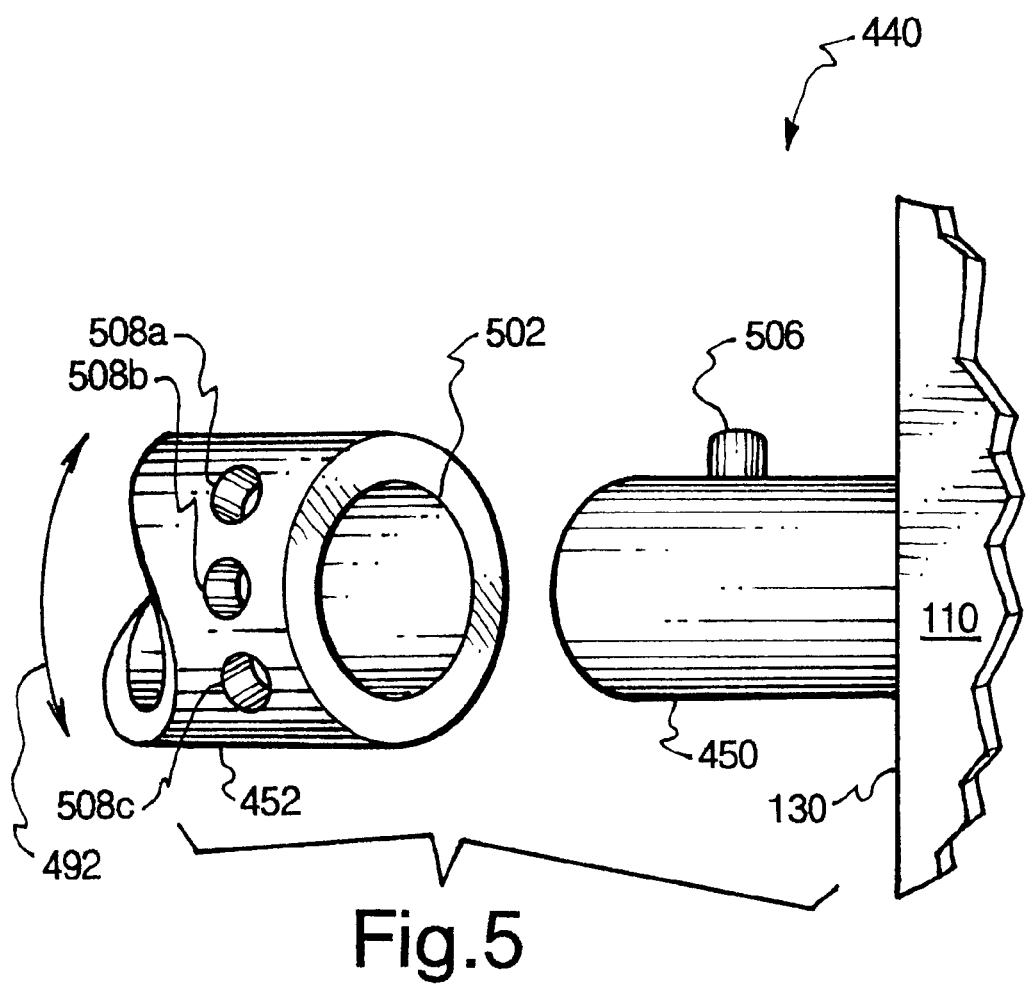
FIG. 5 is a close-up, exploded view of a rotational coupling in accordance with the present invention.

Referring to FIG. 5, a close-up, exploded view of a portion of the rod and collar assembly 440 is shown. The rod 450 is shown attached to the left side 130 of the display screen 110. The rod 450 may be integrally formed with the display screen 110, or may be part of a modular attachment designed to be attached to an existing display screen 110. The collar 452 is attached to the first end 470 of the strut 442, and contains a bore 502 to receive the rod 450. The rod and collar assembly 440 may first be assembled by sliding the collar 452 in the lateral direction 104, into engagement with the rod 450. The camera 444 may then be positioned by rotating the collar 452 around the rod 450 in the direction 492.

Once the camera 444 is positioned in the desired location, the collar 452 may be held in place by friction between the bore 502 and the rod 450. If desired, the rod 450 and the bore 502 may be sized to provide a relatively tight clearance fit to provide the necessary friction. Alternatively, the rod and collar assembly 440 may contain a locking mechanism. In FIG. 5, the locking mechanism consists of a button 506 located on the rod 450 and a plurality of locking apertures 508a, 508b, and 508c arrayed at least partially around an outside diameter of the collar 452. The button 506 extends into one of the locking apertures 508a, 508b, or 508c to fix the position of the collar 452 with respect to the rod 450. To adjust the position of the camera 444, the person 120 may depress the button 506 and rotate the collar 452 in the direction 492 until the button 506 extends into another locking aperture 508a, 508b, or 508c that corresponds to the desired location of the camera 444.

Figure 6:
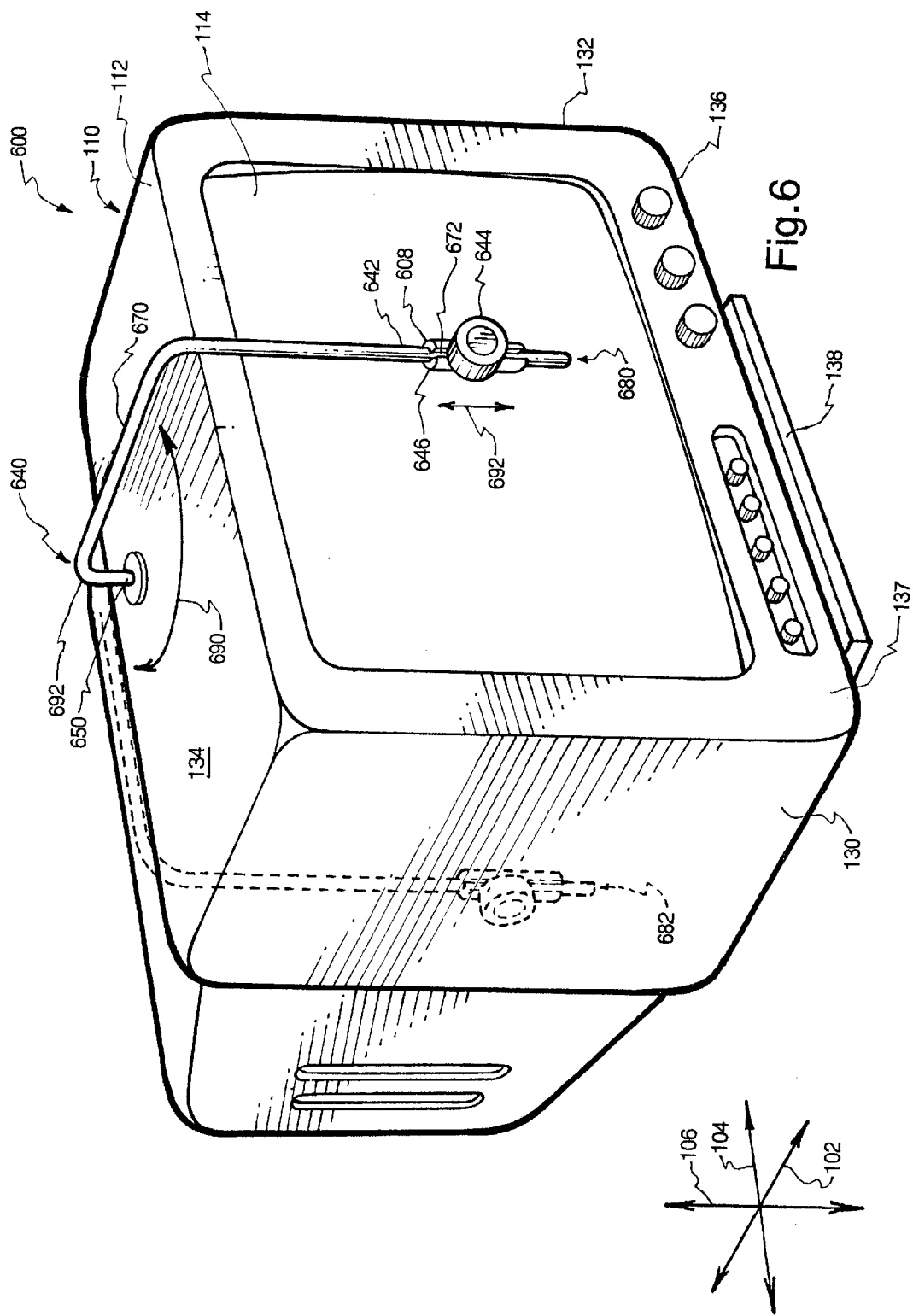
FIG. 6 is a perspective view of another alternative embodiment of an apparatus for obtaining a video signal from a position proximate an eye level of a person viewing a display screen and FIGS. 7A and 7B close-up views of the front and back sides, respectively, of a camera translational coupling shown in FIG. 6.

Referring to FIG. 6, another alternative embodiment shows an apparatus 600 for obtaining a video signal from a position proximate an eye level of a person viewing a display screen. The apparatus 600 has a rotational coupling 640 positioned on the top side 134 of the display screen 110. Once again, the rotational coupling 640 is implemented as a rod and collar assembly 640. A strut 642 extends vertically across part of the screen portion 114. A first end 670 of the strut 642 is attached to the rod and collar assembly 640. A camera portion 672 of the strut 642 is attached to a camera 644 such that the camera 644 can be positioned between the screen portion 114 and the person 120. In FIG. 6, the camera 644 is attached to a camera translational coupling 646 that slidably grips the strut 642. Thus, in FIG. 6, the camera 644 is movable along the camera portion 672 of the strut 642.

The rod and collar assembly 640 shown in FIG. 6 includes a collar 650 attached to the display screen 110 and a rod 652 that fits inside a bore of the collar 650. The rod 652 is attached to the first end 670 of the strut 642. The rod 652 is inserted into the collar 650 such that the rod 652 rotates within the collar 650. Thus, the camera 644 may be rotated within a plane that is substantially perpendicular to the screen portion 114 of the display screen 110. The camera 644 may be rotated between an eye level position 680 and a retracted position 682 in the direction shown by the arrow 690.

The camera translational coupling 646 may take the form of a gripping sleeve 646 that grips the strut 642, yet allows the person 120 to move the camera 644 along the strut 642 in a transverse direction 106. Of course, a different type of camera translational coupling could be used, such as a telescoping segment (not shown) that slides within the strut 642. In such an embodiment, the camera 644 would be attached to the telescoping segment, and the position of the camera 644 could be adjusted by sliding the telescoping segment in or out of the strut 642.

The camera translational coupling 612 allows the camera 644 to be positioned by raising or lowering the camera in a transverse direction 106. Of course, the camera translational coupling 612 could be used in conjunction with the embodiment shown in FIG. 4, so that the position of the camera could be adjusted in a lateral direction 104. Alternatively, the rotational coupling 640 may be attached to the front side 137 of the display screen 110, allowing the camera 644 to be rotated within a plane that is substantially parallel to the screen portion 114. In such an embodiment, the camera translational coupling 612 would allow the person 120 to adjust the position of the camera 644 in a transverse direction 106, a lateral direction 104, or some combination thereof.

Figures 7A, 7B:
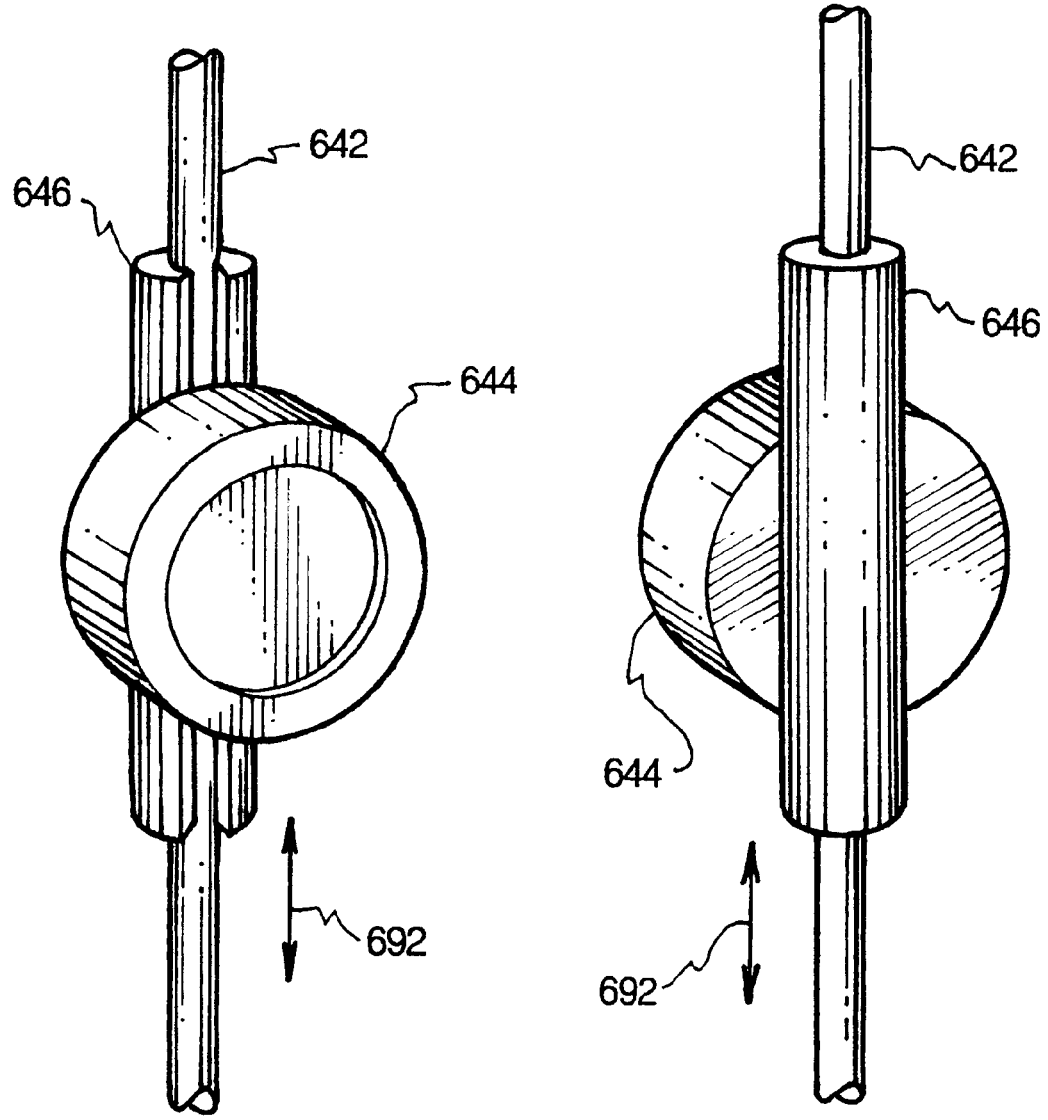

FIGS. 7A and 7B show close-up views of the gripping sleeve 646 and the camera 644. The gripping sleeve 646 may be made out of any suitable material such as rubber or plastic. The gripping sleeve 646 fits tightly around the strut 642 so that it maintains its position without being held in place by the person 120. At the same time, the gripping sleeve 646 is loose enough that it is capable of being moved along the strut 642 in the direction shown by the arrow 692. The gripping sleeve 646 may be formed as an integral part of the camera 644, or it may be attached using any suitable attachment method, such as an adhesive or a hook and loop fastener (e.g., Velcro®).

Based on the foregoing, the present invention offers a number of advantages that are not available in conventional approaches. The person can relatively easily retrofit an apparatus according to the invention to existing hardware such as a television or computer monitor. Furthermore, the person can relatively easily position the camera proximate their eye level or in a retracted position to avoid interfering with other uses of the display screen. Thus, during videoconferencing, a person can receive the impression that the person with whom they are communicating is looking them directly in the eye.

While specific embodiments and applications of the present invention have been illustrated and described, it is to be understood that the invention is not limited to the precise configuration and components disclosed herein. Various modifications, changes, and variations apparent to those skilled in the art may be made in the arrangement, operation, and details of the methods and systems of the present invention disclosed herein without departing from the spirit and scope of the invention.

What is claimed is:

1. An apparatus for obtaining a video signal from a position proximate an eye level of a person viewing a display screen, the apparatus comprising:

a strut disposed at least partly across the display screen, the strut comprising a first end and a camera portion;

a first translational coupling attached to the first end to couple the first end to a first side of the display screen such that the first end translates substantially perpendicular to the strut;

a camera disposed at the camera portion such that the camera is positioned between the display screen and the person; and an actuator that moves the first end of the strut along the first translational coupling when activated by a user.

2. The apparatus of claim 1, wherein the strut is disposed horizontally.

3. The apparatus of claim 1, wherein the strut is disposed vertically.

4. The apparatus of claim 1, further comprising a camera translational coupling that movably couples the camera to the strut to permit motion of the camera along the camera portion.

5. The apparatus of claim 1, wherein the strut further comprises a second end, the apparatus further comprising:

a second translational coupling attached to the second end to movably couple the second end to a second side of the display screen, opposite the first side.

6. The apparatus of claim 1, wherein the first translational coupling comprises:

a track rigidly affixed to a housing of the display screen; and a slider rigidly affixed to the first end of the strut, the slider slidably engaging the track to permit motion of the first end along the track.

7. The apparatus of claim 1, wherein the first translational coupling comprises:

an axle rigidly affixed to the first end of the strut; and a roller rotationally coupled to the axle and positioned to roll along a housing of the display screen.

8. The apparatus of claim 1, wherein the first translational coupling comprises:

a worm gear rotationally attached to a housing of the display screen, the worm gear extending along the first side of the display screen; and a collar threadably coupled to the worm gear and rigidly affixed to the first end to induce translation of the first end in response to rotation of the worm gear.

9. The apparatus of claim 1, wherein the camera is disposed at the center of the display screen.

10. The apparatus of claim 1, wherein the first translational coupling frictionally restricts motion of the strut along the first side such that the camera remains substantially stationary in the absence of force applied by it the user.

11. The apparatus of claim 1, further comprising a locking mechanism that restricts motion of the strut along the first side such that the camera remains substantially stationary in the absence of force applied by the user.

12. The apparatus of claim 11, wherein the locking mechanism comprises:

a series of locking apertures disposed along the first translational coupling; and a button biased to extend into the locking apertures to fix the position of the strut with respect to the locking apertures.

13. The apparatus of claim 11, wherein the locking mechanism comprises:

a threaded hole movable with the strut along the first side; and a knob with a threaded stem threadable into the threaded role to frictionally arrest motion of the strut.

14. An apparatus for obtaining a video signal from a position proximate an eye level of a person viewing a display screen, the apparatus comprising:

a strut disposed across the display screen, the strut comprising a first end, a second end, and a camera portion between the first and second ends;

a first translational coupling attached to the first end to movably couple the first end to a first side of the display screen;

a second translational coupling attached to the second end to movably couple the second end to a second side of the display screen, opposite the first side; and a camera disposed at the camera portion such that the camera is positioned between the display screen and the person.

15. An apparatus for obtaining a video signal from a position proximate an eye level of a person viewing a display screen, the apparatus comprising:

a strut disposed at least partly across the display screen, the strut comprising a first end and a camera portion;

a track rigidly affixed to a first side of the display screen;

a slider rigidly affixed to the first end of the strut, the slider slidably engaging the track to permit motion of the first end along the track;

a camera disposed at the camera portion such that the camera is positioned between the display screen and the person; and an actuator that moves the first end of the strut along the first translational coupling when activated by a user.

16. An apparatus for obtaining a video signal from a position proximate an eye level of a person viewing a display screen, the apparatus comprising:

a strut disposed at least partly across the display screen, the strut comprising a first end and a camera portion;

an axle rigidly affixed to the first end of the strut;

a roller rotationally coupled to the axle and positioned to roll along a first side of the display screen; and a camera disposed at the camera portion such that the camera is positioned between the display screen and the person.

17. An apparatus for obtaining a video signal from a position proximate an eye level of a person viewing a display screen, the apparatus comprising:
 a strut disposed at least partly across the display screen, the strut comprising a first end and a camera portion;
 a worm gear rotationally attached along a first side of the display screen; a collar threadably coupled to the worm gear and rigidly affixed to the first end to induce translation of the first end in response to rotation of the worm gear; and
 a camera disposed at the camera portion such that the camera is positioned between the display screen and the person.

18. An apparatus for obtaining a video signal from a position proximate an eye level of a person viewing a display screen, the apparatus comprising:
 a strut disposed at least partly across the display screen, the strut comprising a first end and a camera portion;
 a first translational coupling attached to the first end to couple the first end to a first side of the display screen such that the first end translates substantially perpendicular to the strut, wherein the first translational coupling comprises an axle rigidly affixed to the first end of the strut and a roller rotationally coupled to the axle and positioned to roll along a housing of the display screen; and
 a camera disposed at the camera portion such that the camera is positioned between the display screen and the person.

19. The apparatus of claim 18, further comprising a camera translational coupling that movably couples the camera to the strut to permit motion of the camera along the camera portion.

20. The apparatus of claim 18, wherein the strut further comprises a second end, the apparatus further comprising:
 a second translational coupling attached to the second end to movably couple the second end to a second side of the display screen, opposite the first side.

21. The apparatus of claim 18, wherein the first translational coupling frictionally restricts motion of the strut along the first side such that the camera remains substantially stationary in the absence of force applied by the user.

22. The apparatus of claim 18, further comprising a locking mechanism that restricts motion of the strut along the first side such that the camera remains substantially stationary in the absence of force applied by the user.

23. An apparatus for obtaining a video signal from a position proximate an eye level of a person viewing a display screen, the apparatus comprising:
 a strut disposed at least partly across the display screen, the strut comprising a first end and a camera portion;
 a first translational coupling attached to the first end to couple the first end to a first side of the display screen such that the first end translates substantially perpendicular to the strut, wherein the first translational coupling comprises a worm gear rotationally attached to a housing of the display screen, the worm gear extending along the first side of the display screen, and a collar threadably coupled to the worm gear and rigidly affixed to the first end to induce translation of the first end in response to rotation of the worm gear; and
 a camera disposed at the camera portion such that the camera is positioned between the display screen and the person.

24. The apparatus of claim 23, further comprising a camera translational coupling that movably couples the camera to the strut to permit motion of the camera along the camera portion.

25. The apparatus of claim 23, wherein the strut further comprises a second end, the apparatus further comprising:
 a second translational coupling attached to the second end to movably couple the second end to a second side of the display screen, opposite the first side.

26. The apparatus of claim 23, wherein the first translational coupling frictionally restricts motion of the strut along the first side such that the camera remains substantially stationary in the absence of force applied by the user.

27. The apparatus of claim 23, further comprising a looking mechanism that restricts motion of the strut along the first side such that the camera remains substantially stationary in the absence of force applied by the user.

28. An apparatus for obtaining a video signal from a position proximate an eye level of a person viewing a display screen, the apparatus comprising:
 a strut disposed at least partly across the screen, the strut comprising a first end and a camera portion;
 a rotational coupling attached to the first end to couple the first end to a first side of the display screen such that the first end rotates within a plane substantially perpendicular to a screen portion of the display screen, wherein the rotational coupling comprises:
  a male portion; and
  a female portion, wherein the male portion is inserted into the female portion such that the female portion rotates around the male portion, wherein the male portion is a rod attached to the display screen, and the female portion is a collar having a bore at one end to receive the rod;
 a camera disposed at the camera portion such that the camera is positioned between the display screen and the person; and
 a locking mechanism to restrict rotation of the collar about the rod, wherein the locking mechanism comprises:
  a plurality of locking apertures arrayed at least partially around an outside diameter of the collar; and
  a button located on the rod, wherein the button is biased to extend into the locking apertures to fix the position of the collar with respect to the rod.

29. The apparatus of claim 28, wherein the strut is disposed horizontally.

30. The apparatus of claim 28, wherein the strut is disposed vertically.

31. The apparatus of claim 28, further comprising a camera translational coupling that movably couples the camera to the camera portion to permit motion of the camera along the strut.

32. The apparatus of claim 31, wherein the camera translational coupling comprises a telescoping segment that slides within the strut, and wherein the camera is attached to the telescoping segment.

33. The apparatus of claim 31, wherein the camera translational coupling comprises a gripping sleeve attached to the camera to slidably grip the strut.

34. The apparatus of claim 28, wherein the rotational coupling frictionally restricts rotation of the collar about the rod.

35. The apparatus of claim 28, wherein the camera is disposed at the center of the display screen.

36. An apparatus for obtaining a video signal from a position proximate an eye level of a person viewing a display screen, the apparatus comprising:

a strut disposed at least partly across the screen, the strut comprising a first end and a camera portion;

a rotational coupling attached to the first end to couple the first end to a first side of the display screen such that the first end rotates within a plane substantially perpendicular to a screen portion of the display screen, wherein the rotational coupling comprises a male portion and a female portion, wherein the male portion is inserted into the female portion such that the female portion rotates around the male portion, wherein the male portion is a rod attached to the display screen, and the female portion is a collar having a bore at one end to receive the rod;

a locking mechanism to restrict rotation of the collar about the rod, wherein the locking mechanism comprises a plurality of locking apertures arrayed at least partially around an outside diameter of the collar and a button located on the rod, wherein the button is biased to extend into the locking apertures to fix the position of the collar with respect to the rod; and a camera disposed at the camera portion such that the camera is positioned between the display screen and the person.

37. An apparatus for obtaining a video signal from a position proximate an eye level of a person viewing a display screen, the apparatus comprising:

a strut disposed at least partly across the screen, the strut comprising a first end and a camera portion;

a rotational coupling attached to the first end to couple the first end to a first side of the display screen, wherein the rotational coupling comprises:
  a male portion; and
  a female portion, wherein the male portion is inserted into the female portion such that the female portion rotates around the male portion, wherein the male portion is a rod attached to the display screen, and the female portion is a collar having a bore at one end to receive the rod;

a camera disposed at the camera portion such that the camera is positioned between the display screen and the person;

a camera translational coupling that movably couples the camera to the strut to permit motion of the camera along the strut; and a locking mechanism to restrict rotation of the collar about the rod, wherein the locking mechanism comprises:
  a plurality of locking apertures arrayed at least partially around an outside diameter of the collar; and
  a button located on the rod, wherein the button is biased to extend into the locking apertures to fix the position of the collar with respect to the rod.

38. The apparatus of claim 37, wherein the strut is disposed horizontally.

39. The apparatus of claim 37, wherein the strut is disposed vertically.

40. The apparatus of claim 37, wherein the camera translational coupling comprises a telescoping segment that slides within the strut, and wherein the camera is attached to the telescoping segment.

41. The apparatus of claim 37, wherein th e camera translational coupling comprises a gripping sleeve attached to the camera to slidably grip the strut.

42. The apparatus of claim 37, wherein the rotational coupling frictionally restricts rotation of the collar about the rod.

43. The apparatus of claim 37, wherein the camera is disposed at the center of the display screen.

44. A method for obtaining a video signal from a position proximate an eye level of a person viewing a display screen, the method comprising:

providing a strut comprising a first end and a camera portion;

attaching a first translational coupling to the first end of the strut;

disposing a camera at the camera portion;

disposing the first translational coupling to permit motion of the first end along a first side of the display screen, substantially perpendicular to the strut;

utilizing the first translational coupling to move the first end such that the strut extends at least partially across the display screen to position the camera between the display screen and the person, proximate the eye level of the person;

providing an actuator; and utilizing the actuator to move the first end of the strut along the first translational coupling when activated by a user.

45. The method of claim 44, wherein the strut extends horizontally.

46. The method of claim 44, wherein the strut extends vertically.

47. The method of claim 44, further comprising:

movably coupling the camera to the camera portion with a camera translational coupling; and utilizing the camera translational coupling to move the camera along the camera portion toward the eye level of the person.

48. The method of claim 44, wherein the strut further comprises a second end and a second translational coupling attached to the second end of the strut, the method further comprising:

utilizing the second translational coupling to move the second end in tandem with the first end.

49. The method of claim 44, wherein providing the first translational coupling comprises providing a track and a slider rigidly affixed to the first end of the strut, the slider slidably engaging the track to permit motion of the first end along the track.

50. The method of claim 44, wherein providing the first translational coupling comprises providing an axle rigidly affixed to the first end of the strut and a roller rotationally coupled to the axle to roll along the first side of the display screen.

51. The method of claim 44, wherein providing the first translational coupling comprises providing a worm gear and a collar threadably coupled to the worm gear and rigidly affixed to the first end such that rotation of the worm gear induces translation of the first end of the strut.

52. The method of claim 44, wherein the camera is positioned at the center of the display screen.

53. The method of claim 44, wherein the first translational coupling frictionally resists motion of the strut along the first side, the method further comprising:

maintaining the camera proximate the eye level via frictional resistance of the first translational coupling.

54. The method of claim 44, further comprising providing a locking mechanism that is selectively lockable to restrain translation of the strut, the method further comprising:

locking the locking mechanism to maintain the camera proximate the eye level.

55. The method of claim 54, wherein locking the locking mechanism comprises inserting a button into one of a series of locking aperture disposed along the first translational coupling.

56. The method of claim 54, wherein locking the locking mechanism comprises threading a knob with a threaded stem into a threaded hole that moves with the strut to frictionally arrest motion of the strut.

57. A method for obtaining a video signal from a position proximate an eye level of a person viewing a display screen, the method comprising:
providing a strut comprising a first end, a second end, and a camera portion between the first and second ends;
attaching a first translational coupling to the first end of the strut;
attaching a second translational coupling to the second end of the strut;
disposing a camera at the camera portion;
disposing the first translational coupling to permit motion of the first end along a first side of the display screen;
disposing the second translational coupling to permit motion of the second end along a second side of the display screen, opposite the first side; and
utilizing the first and second translational couplings to move the first and second ends such that the strut extends at least partially across the display screen to position the camera between the display screen and the person, proximate the eye level of the person.

58. A method for obtaining a video signal from a position proximate an eye level of a person viewing a display screen, the method comprising:
providing a strut comprising a first end and a camera portion;
rigidly affixing a slider to the first end of the strut;
disposing a track to slidably receive the slider;
disposing a camera at the camera portion;
attaching the track along a first side of the display screen to permit motion of the first end along the first side;
sliding the slider within the track to move the first end such that the strut extends at least partially across the display screen to position the camera between the display screen and the person, proximate the eye level of the person;
providing an actuator; and
utilizing the actuator to move the first end of the strut along the first translational coupling when activated by a user.

59. A method for obtaining a video signal from a position proximate an eye level of a person viewing a display screen, the method comprising:
providing a strut comprising a first end and a camera portion;
rigidly affixing an axle to the first end of the strut;
rotationally coupling a roller to the axle;
disposing a camera at the camera portion;
disposing the roller to roll along a first side of the display screen; and
rolling the roller along the first side to move the first end such that the strut extends at least partially across the display screen to position the camera between the display screen and the person, proximate the eye level of the person.

60. A method for obtaining a video signal from a position proximate an eye level of a person viewing a display screen, the method comprising:
providing a strut comprising a first end and a camera portion;
rigidly affixing a collar to the first end of the strut;
threadably coupling a worm gear to the collar,
disposing a camera at the camera portion;
rotationally attaching the worm gear to a first side of the display screen; and
rotating the worm gear to induce translation of the first end such that the strut extends at least partially across the display screen to position the camera between the display screen and the person, proximate the eye level of the person.

61. A method for obtaining a video signal from a position proximate an eye level of a person viewing a display screen, the method comprising:
providing a strut comprising a first end and a camera portion;
attaching a rotational coupling to the first end of the strut, wherein the rotational coupling comprises:
a male portion; and
a female portion, wherein the male portion is inserted into the female portion such that the female portion rotates around the male portion, wherein the male portion is a rod attache to the display screen, and the female portion is a collar having a bore at one end to receive the rod;
disposing a camera at the camera portion;
disposing the rotational coupling to permit rotation of the first end within a plane substantially perpendicular to a screen portion of the display screen;
utilizing the rotational coupling to move the first end such that the strut extends at least partially across the display screen to position the camera between the display screen and the person, proximate the eye level of the person;
providing a locking mechanism to restrict motion of the collar about the rod; and
locking the locking mechanism to maintain the camera proximate the eye level, wherein locking the locking mechanism comprises inserting a button located on the rod into one of a plurality of locking apertures arrayed at least partially around an outside diameter of the collar.

62. The method of claim 61, wherein the strut is disposed horizontally.

63. The method of claim 61, wherein the strut is disposed vertically.

64. The method of claim 61, further comprising:
movably coupling the camera to the camera portion with a camera translational coupling; and
utilizing the camera translational coupling to move the camera along the camera portion toward the eye level of the person.

65. The method of claim 64, wherein the camera translational coupling comprises a telescoping segment that slides within the strut, and the camera is attached to the telescoping segment.

66. The method of claim 64, wherein the camera translational coupling comprises a gripping sleeve attached to the camera to slidably grip the strut.

67. The method of claim 61, wherein the rotational coupling frictionally restricts motion of the collar about the rod, the method further comprising:
maintaining the camera proximate the eye level via frictional resistance of the rotational coupling.

68. The method of claim 61, wherein the camera is disposed at the center of the display screen.

69. A method for obtaining a video signal from a position proximate an eye level of a person viewing a display screen, the method comprising:

provided a strut comprising a first end and a camera portion;

attaching a rotational coupling to the first end of the strut, wherein the rotational coupling comprises:
- a male portion; and
- a female portion, wherein the male portion is inserted is into the female portion such that the female portion rotates around the male portion, wherein the male portion is a rod attached to the display screen, and the female portion is a collar having a bore at one end to receive the rod;

movably coupling a camera to the camera portion with a camera translational coupling to permit motion of the camera along the strut;

disposing the rotational coupling to permit rotation of the first end with respect to the display screen;

utilizing the rotational coupling to move the first end such that the strut extends at least partially across the display screen;

utilizing the camera translational coupling to position the camera between the display screen and the person, proximate the eye level of the person;

providing a locking mechanism to restrict motion of the collar about the rod; and locking the locking mechanism to maintain the camera proximate the eye level, wherein locking the locking mechanism comprises inserting a button located on the rod into one of a plurality of locking apertures arrayed at least partially around an outside diameter of the collar.

70. The method of claim 69, wherein the strut is disposed horizontally.

71. The method of claim 69, wherein the strut is disposed vertically.

72. The method of claim 69, wherein the camera translational coupling comprises a telescoping segment that slides within the strut, and wherein the camera is attached to the telescoping segment.

73. The method of claim 69, wherein the camera translational coupling comprises a gripping sleeve attached to the camera to slidably grip the strut.

74. The method of claim 69, wherein the rotational coupling frictionally restricts motion of the collar about the rod, the, method further comprising:

maintaining the camera proximate the eye level via frictional resistance of the rotational coupling.

75. The method of claim 69, wherein the camera is disposed at the center of the display screen.

* * * * *

UNITED STATES PATENT AND TRADEMARK OFFICE
CERTIFICATE OF CORRECTION

PATENT NO. : 6,798,457 B2
DATED : September 28, 2004
INVENTOR(S) : James H. Boyden, David W. Meibos and Thomas M. Hardman It is certified that error appears in the above-identified patent and that said Letters Patent is hereby corrected as shown below:

Column 14,
Line 9, "force applied by it the" should be -- force applied by the --.

Column 17,
Line 62, "wherein th e camera" should be -- wherein the camera --.

Column 19,
Line 3, "locking aperture disposed along" should be -- locking apertures disposed along --.

Column 20,
Line 25, "is a rod attache to the display" should be -- is a rod attached to the display --.

Column 22,
Line 22, "...the, method further ..." should be -- the method further --.

Signed and Sealed this

Twenty-eighth Day of December, 2004

JON W. DUDAS
*Director of the United States Patent and Trademark Office*